(12) United States Patent
Vanstone et al.

(10) Patent No.: US 8,462,944 B2
(45) Date of Patent: *Jun. 11, 2013

(54) METHOD OF PUBLIC KEY GENERATION

(75) Inventors: Scott Alexander Vanstone, Campbellville (CA); Ashok Vadekar, Rockwood (CA); Robert John Lambert, Cambridge (CA); Robert Philip Gallant, Corner Brook (CA); Daniel Richard L. Brown, Mississauga (CA); Alfred John Menezes, Waterloo (CA)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,184

(22) Filed: Jul. 12, 2011

(65) Prior Publication Data

US 2011/0268270 A1 Nov. 3, 2011

Related U.S. Application Data

(63) Continuation of application No. 12/119,248, filed on May 12, 2008, now Pat. No. 8,000,470, which is a continuation of application No. 10/025,924, filed on Dec. 26, 2001, now Pat. No. 7,372,961.

(30) Foreign Application Priority Data

Dec. 27, 2000 (CA) .................................. 2329590

(51) Int. Cl.
*H04L 9/30* (2006.01)

(52) U.S. Cl.
USPC ................ 380/44; 380/46; 380/277; 708/250

(58) Field of Classification Search
USPC ............................... 380/44, 277, 46; 708/250
See application file for complete search history.

(56) References Cited

U.S. PATENT DOCUMENTS

| | | | |
|---|---|---|---|
| 5,046,094 A | 9/1991 | Kawamura et al. | |
| 5,073,935 A | 12/1991 | Pastor | |
| 5,383,143 A * | 1/1995 | Crouch et al. ................ | 708/254 |
| 5,987,131 A | 11/1999 | Clapp | |
| 6,088,798 A | 7/2000 | Shimbo | |
| 6,132,312 A * | 10/2000 | Hecht ............................. | 463/19 |
| 6,195,433 B1 * | 2/2001 | Vanstone et al. .............. | 380/285 |
| 6,219,421 B1 | 4/2001 | Backal | |
| 6,307,938 B1 | 10/2001 | Matyas, Jr. et al. | |
| 6,327,660 B1 | 12/2001 | Patel | |

(Continued)

FOREIGN PATENT DOCUMENTS

EP 0854603 A2 7/1998

OTHER PUBLICATIONS

Schneier, Bruce; "Applied Cryptography"; 2nd ed., 1996, Chapter 20, pp. 483 to 490; John Wiley & Sons.

(Continued)

*Primary Examiner* — Michael Pyzocha
(74) *Attorney, Agent, or Firm* — Oblon, Spivak, McClelland, Maier & Neustadt, L.L.P.

(57) ABSTRACT

A potential bias in the generation of a private key is avoided by selecting the key and comparing it against the system parameters. If a predetermined condition is attained it is accepted. If not it is rejected and a new key is generated.

20 Claims, 7 Drawing Sheets

U.S. PATENT DOCUMENTS

| | | | |
|---|---|---|---|
| 6,337,909 | B1 * | 1/2002 | Vanstone et al. ............... 380/28 |
| 6,459,791 | B1 * | 10/2002 | M'Raihi et al. ............... 380/30 |
| 7,447,913 | B2 | 11/2008 | Drexler et al. |
| 2002/0116527 | A1 | 8/2002 | Chen et al. |
| 2003/0084332 | A1 | 5/2003 | Krasinski et al. |

OTHER PUBLICATIONS

Nel, J.J. et al.; "Generation of Keys for Use with the Digital Signature Standard (DSS)"; Proceedings of the 1993 IEEE South African Symposium on Communications and Signal Processing; Aug. 6, 1993; pp. 6 to 11; IEEE.

* cited by examiner

METHOD OF PUBLIC KEY GENERATION

CROSS-REFERENCE TO RELATED APPLICATIONS

This application is a continuation of U.S. patent application Ser. No. 12/119,248 filed May 12, 2008, which is a continuation of U.S. patent application Ser. No. 10/025,924 filed Dec. 26, 2001, now U.S. Pat. No. 7,372,961, which claims priority from Canadian Patent Application No. 2,329,590 filed Dec. 27, 2000, all of which are incorporated herein by reference.

FIELD OF INVENTION

The present invention relates to public key cryptosystems and more particularly to key generation within such systems.

BACKGROUND OF THE INVENTION

The basic structure of a public key cryptosystem is well known and has become ubiquitous with security in data communication systems. Such systems use a private key k and a corresponding public key $\alpha^k$ where $\alpha$ is a generator of the group. Thus one party may encrypt a message m with the intended recipients public key and the recipient may apply his private key to decrypt it.

Similarly, the cryptosystems may be used for key agreement protocols where each party exponentiates the other party's public key with their own private key. Thus party A will take B's public key $\alpha^b$ and exponentiate it with A's private key a to obtain a session key $\alpha^{ab}$. Similarly, B will take A's public key $\alpha^a$ and exponentiate it with B's private key b to obtain the same session key $\alpha^{ab}$. Thereafter data may be transferred using a symmetric key protocol utilizing the common session key.

Public key cryptosystems may also be used to sign messages to authenticate the author and/or the contents. In this case the sender will sign a message using his private key and a recipient can verify the message by applying the public key of the sender. If the received message and the recovered message correspond then the authenticity is verified.

The public key cryptosystems rely on the intractability of the discrete log problem in finite field arithmetic, that is even when the generator a and public key are known, it is computationally infeasible to obtain the corresponding private key. The security of such systems does therefore depend on the private key remaining secret. To mitigate the opportunity of disclosing the private key, protocols have been developed that use a pair of private keys and corresponding public keys, referred to as long term and short term or ephemeral key pairs respectively. The ephemeral private key is generated at the start of each session between a pair of correspondents, usually by a random number generator. The corresponding ephemeral public key is generated and the resultant key pair used in one of the possible operations described above. The long-term public key is utilized to authenticate the correspondent through an appropriate protocol. Once the session is terminated, the ephemeral key is securely discarded and a new ephemeral key generated for a new session.

Some of the more popular protocols for signature are the ElGamal family of signature schemes such as the Digital Signature Algorithm or DSA. The DSA algorithm utilizes both long term and ephemeral keys to generate a signature of the message. The DSA domain parameters are preselected. They consist of a prime number p of a predetermined length, by way of example 1024 bits; a prime number q of a predetermined bit length, by way of example 160 bits, where q divides p-1; a generator a lying between 2 and p-1 and which satisfies the condition $(\alpha^q \bmod p)=1$, and; a cryptographic hash function H, such as SHA-1.

The DSA requires the signatory to select an ephemeral key k lying between 1 and q-1. A first signature component r is generated from the generator a such that $r=(\alpha^k \bmod p) \bmod q$, A second signature component s is generated such that $s=k^{-1}(H(m)+dr) \bmod q$, and d is the long term private key of the signatory. The signature on the message m is (r,s). The signature may be verified by computing
H(m), $$u_1 = s^{-1}H(m) \bmod q$$

$$u_2 = s^{-1}r \bmod q$$

$v = \alpha^{u_1}\beta^{u_2} \bmod p$, where $\beta = \alpha^d \bmod p$ is the long term public key of the signatory and finally verifying that $r = v \bmod q$. The use of both the ephemeral and long-term keys in the signature binds the identity of the signatory to the ephemeral key but does not render the long-term key vulnerable.

A similar signature protocol known as ECDSA may be used for elliptic curve cryptosystems. In this protocol k is selected in the interval 1 to n-1 where n is an l bit prime. The signature component r is generated by converting the x coordinate of the public key kP, where P is the seed point on the curve, to an integer mod n, i.e. $r = x_{kP} \bmod n$. The component $s = k^{-1}(H(m)+dr) \bmod n$ and the signature on the message m is (r,s).

It will be apparent in ElGamal signature schemes such as the DSA and ECDSA, that if an ephemeral key k and the associated message m and signature (r,s) is obtained it may be used to yield the long term private key d and thereafter each of the ephemeral keys k can be obtained. Neither the DSA nor the ECDSA inherently disclose any information about the pubic key k. They both require the selection of k to be performed by a random number generator and it will therefore have a uniform distribution throughout the defined interval. However the implementation of the DSA may be done in such a way as to inadvertently introduce a bias in to the selection of k. This small bias may be exploited to extract a value of the private key d and thereafter render the security of the system vulnerable. One such implementation is the DSS mandated by the National Institute of Standards and Technology (NIST) FIPS 186-2 Standard. The DSS stipulates the manner in which an integer is to be selected for use as a private key. A seed value, SV, is generated from a random number generator which is then hashed by a SHA-1 hash function to yield a bit string of predetermined length, typically 160 bits. The bit string represents an integer between 0 and $2^{160}-1$. However this integer could be greater than the prime q and so the DSS requires the reduction of the integer mod q, i.e. k=SHA-1 (seed) mod q.

Accordingly the algorithm for selecting k may be expressed as:

---
if SHA-1(seed) ≧ q then k ← SHA-1(seed) − q
else k ← SHA-1(seed).

---

With this algorithm it is to be expected that more values will lie in the first interval than the second and therefore there is a potential bias in the selection of k.

Recent work by Daniel Bleichenbacher suggests that the modular reduction to obtain k introduces sufficient bias in to the selection of k that an examination of $2^{22}$ signatures could yield the private key d in $2^{64}$ steps using $2^{40}$ memory units. This suggests that there is a need for the careful selection of the ephemeral key k.

SUMMARY OF THE INVENTION

It is therefore an object of the present invention to obviate or mitigate the above disadvantages in the generation of a private key.

In general terms the present invention provides a key generation technique in which any bias is eliminated during the selection of the key.

BRIEF DESCRIPTION OF THE DRAWINGS

Embodiments of the invention will now be described by way of example only with reference to the accompanying drawings in which.

DESCRIPTION OF THE PREFERRED EMBODIMENTS

Figure 1:
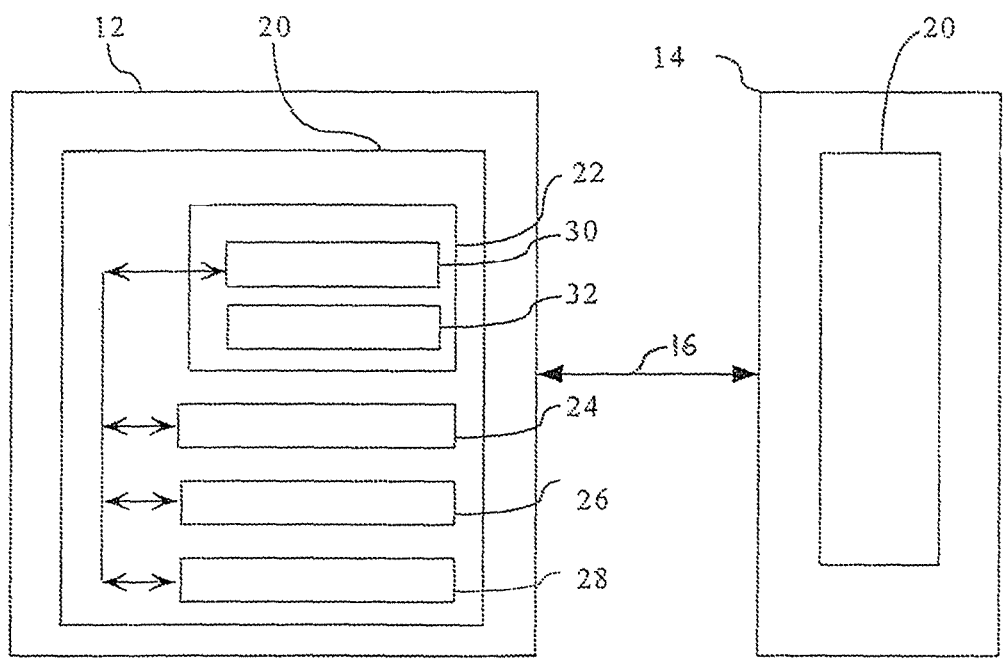
FIG. 1 is a schematic representation of a data communication system.

Referring, therefore to FIG. 1, a data communication system 10 includes a pair of correspondents 12, 14 connected by a communication link 16. The link 16 may be a dedicated link, a multipurpose link such as a telephone connection or a wireless link depending on the particular applications. Similarly, the correspondents 12, 14 may be computer terminals, point-of-sale devices, automated teller machines, constrained devices such as PDA's, cellphones, pagers or any other device enabled for communication over a link 16.

Each of the correspondents 12, 14 includes a secure cryptographic function 20 including a secure memory 22, an arithmetic processor 24 for performing finite field operations, a random number generator 26 and a cryptographic hash function 28 for performing a secure cryptographic hash such as SHA-1. The output of the function 28 will be a bit string of predetermined length, typically 160 bits although other lengths such as 256, 384 or 512 are being used more frequently. It will be appreciated that each of these functions is controlled by a processor executing instructions to provide functionality and inter-operability as is well known in the art.

The secure memory 22 includes a register 30 for storing a long-term private key, d, and a register 32 for storing an ephemeral private key k. The contents of the registers 30, 32 may be retrieved for use by the processor 24 for performing signatures, key exchange and key transport functions in accordance with the particular protocols to be executed under control of the processor.

The long term private key, d, is generated and embedded at the time of manufacture or initialization of the cryptographic function and has a corresponding long-term public key $\alpha^d$. The long-term public key $\alpha^d$ is stored in the memory 22 and is generally made available to other correspondents of the system 10.

The ephemeral key, k, is generated at each signature or other cryptographic exchange by one of the routines disclosed below with reference to FIGS. 2 to 9. Once the key, k, and corresponding public key $\alpha^k$ are generated, k is stored in the register 32 for use in the cryptographic protocol, such as the DSA or ECDSA described above.

Figure 2:
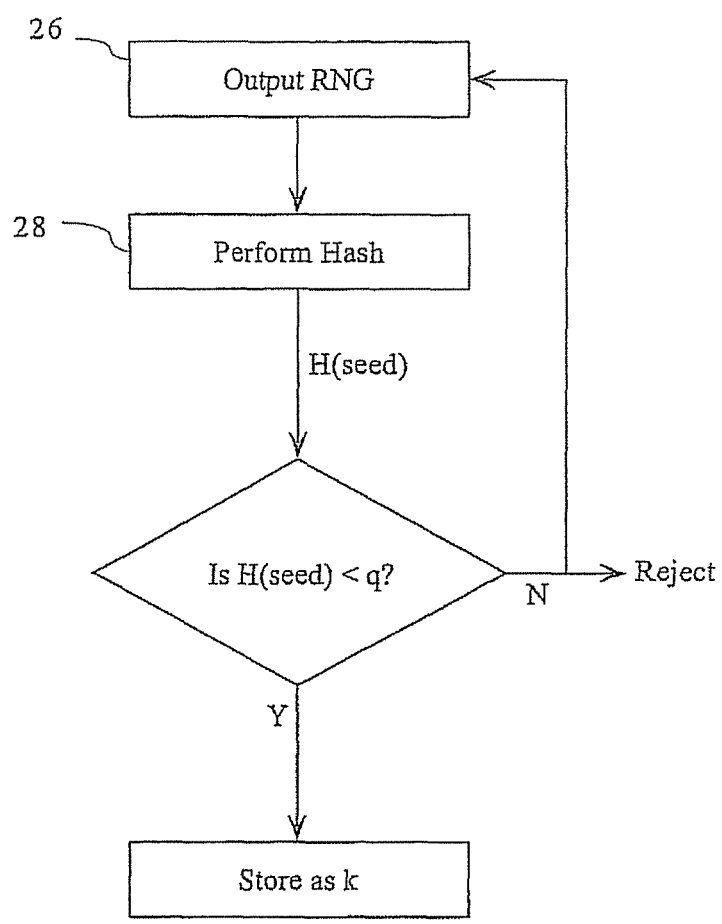
FIG. 2 is a flow chart showing a first embodiment of key generation.

Referring, therefore, to FIG. 2, a first method of generating a key, k, originates by obtaining a seed value (SV) from the random number generator 26. For the purposes of an example, it will be assumed that the cryptographic function is performed over a group of order q, where q is a prime represented as a bit string of predetermined length l. By-way of example only will be assumed that the length l is 160 bits, although, of course, other orders of the field may be used.

To provide a value of k of the appropriate order, the hash function 28 has an l bit output, e.g. a 160 bit output. The bit string generated by the random number generator 26 is greater than l bits and is therefore hashed by the function 28 to produce an output H(seed) of l bits.

The resultant output H(seed) is tested against the value of q and a decision made based on the relative values. If H(seed) <q then it is accepted for use as k. If not the value is rejected and the random number generator is conditioned to generate a new value which is again hashed by the function 28 and tested. This loop continues until a satisfactory value is obtained.

Figure 3:
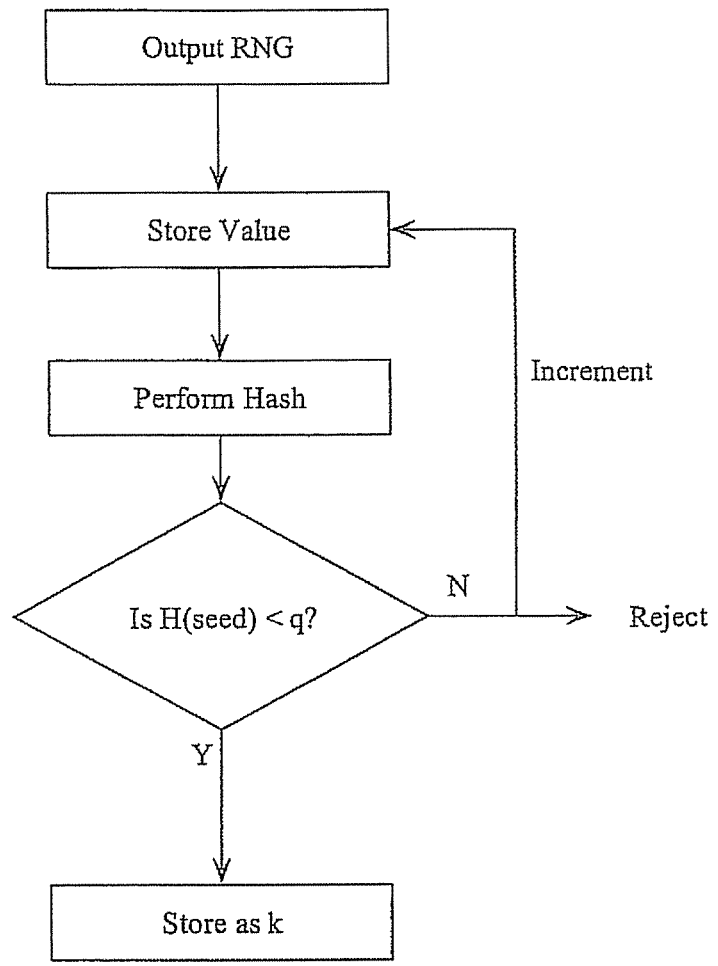
FIG. 3 is a flow chart showing a second embodiment.

A further embodiment is shown in FIG. 3. In this embodiment, the output of the random number generator 26 is hashed by hash function 28 as before and tested against the value of q. If the H(seed) value is not accepted, the output of the random number generator 26 is incremented by a deterministic function and rehashed by function 28.

The resultant value H(seed) is again tested and the procedure repeated until a satisfactory value of k is obtained.

The output may be incremented by adding a particular value to the seed value at each iteration, or may be incremented by applying a non-linear deterministic function to the seed value. For example, the output may be incremented by applying the function $f(seed)=a.seed^2+b \mod 2^{160}$, where a and b are integer constants.

Figure 4:
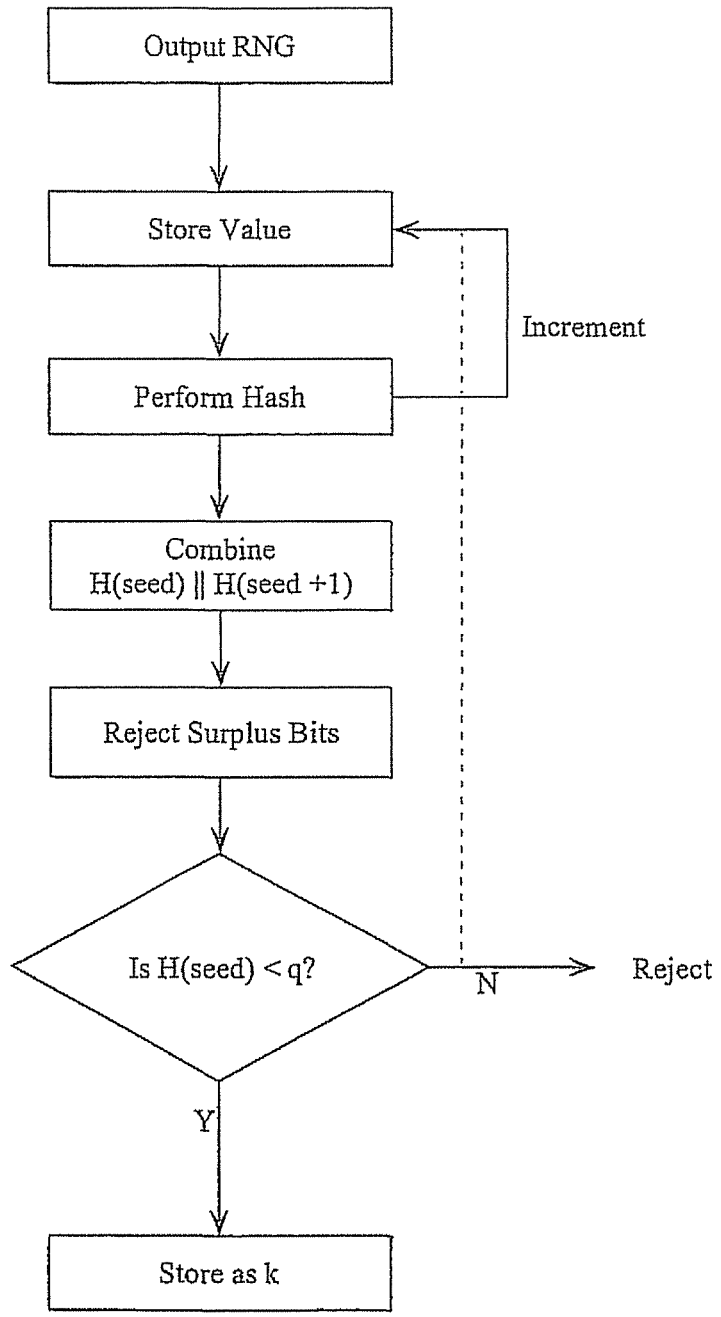
FIG. 4 is a flow chart showing a third embodiment.

A further embodiment is shown in FIG. 4 which has particular applicability to an elliptic curve cryptosystem. By way of example it will be assumed that a 163 bit string is required and that the output of the hash function 28 is 160 bits.

The random number generator 26 generates a seed value SV which is processed by the hash function 28 to obtain a first output H(seed).

The seed value SV is incremented by a selected function to provide a seed value SV+which is further processed by the hash function 28 to provide a second output H(seed+).

The two outputs are then combined, typically by concatenation, to produce a 320 bit string H(seed)|H(seed+). The excess bits, in this case 157 are rejected and the resultant value tested against the value of q. If the resultant value is less than q, it is accepted as the key k, if not the value is rejected.

Upon rejection, the random number generator may generate a new value as disclosed in FIG. 2 or may increment the seed value as disclosed in FIG. 3.

Figure 5:
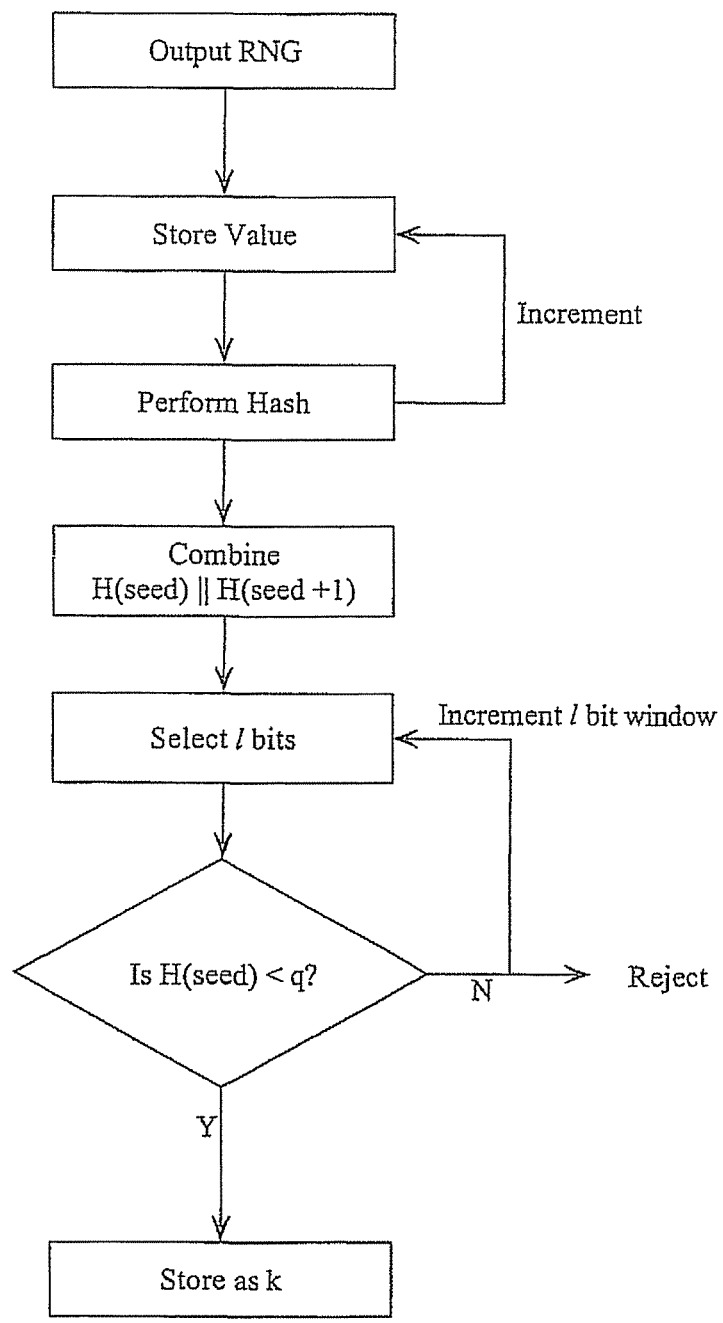
FIG. 5 is a flow chart showing a fourth embodiment.

A further embodiment is shown in FIG. 5 which is similar to that of FIG. 4. In the embodiment of FIG. 5, the selection of the required l bit string is obtained by applying a l-bit wide masking window to the combined bit string.

This is tested against the value of q and if acceptable is used as the value of k. If it is not acceptable it is rejected and the l bit window incremented along the combined bit string to obtain a new value.

The values are tested and the window incremented until a satisfactory value is obtained.

Figure 6:
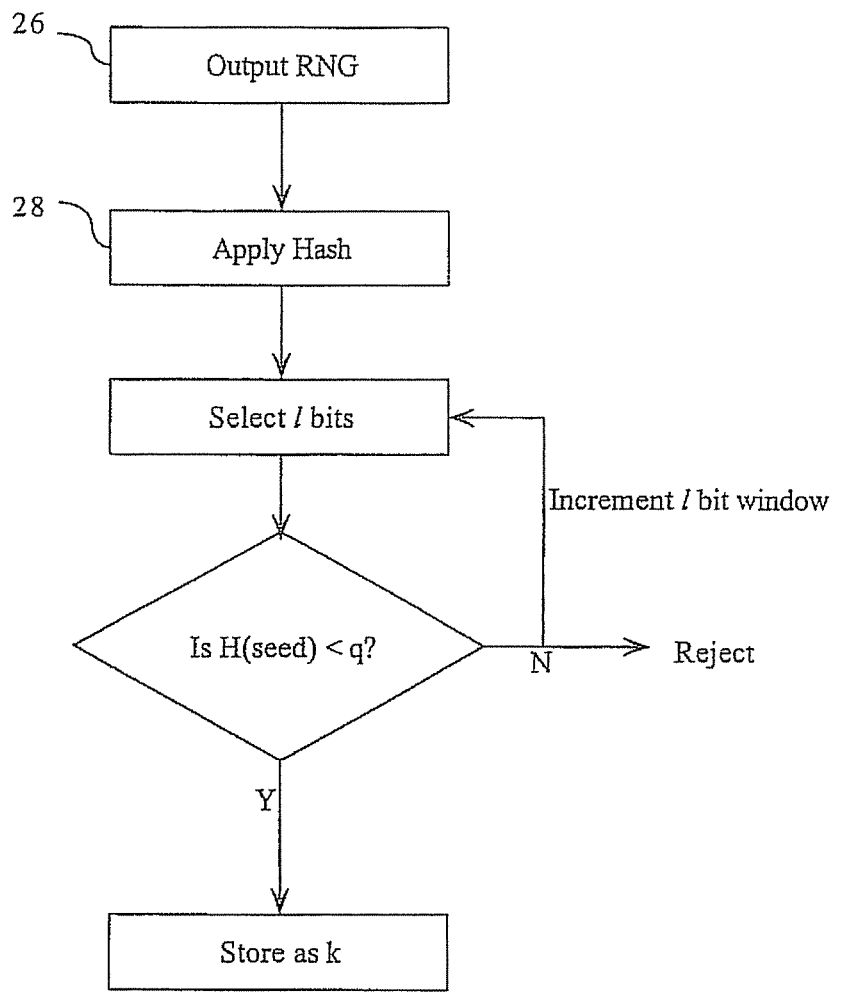
FIG. 6 is a flow chart showing a fifth embodiment.

A similar procedure may be used directly on an extended output of the hash function 28 as shown in FIG. 6 by applying a window to obtain the required l bit string. The bit string is tested against q and the window incremented until a satisfactory value of k is obtained.

Figure 7:
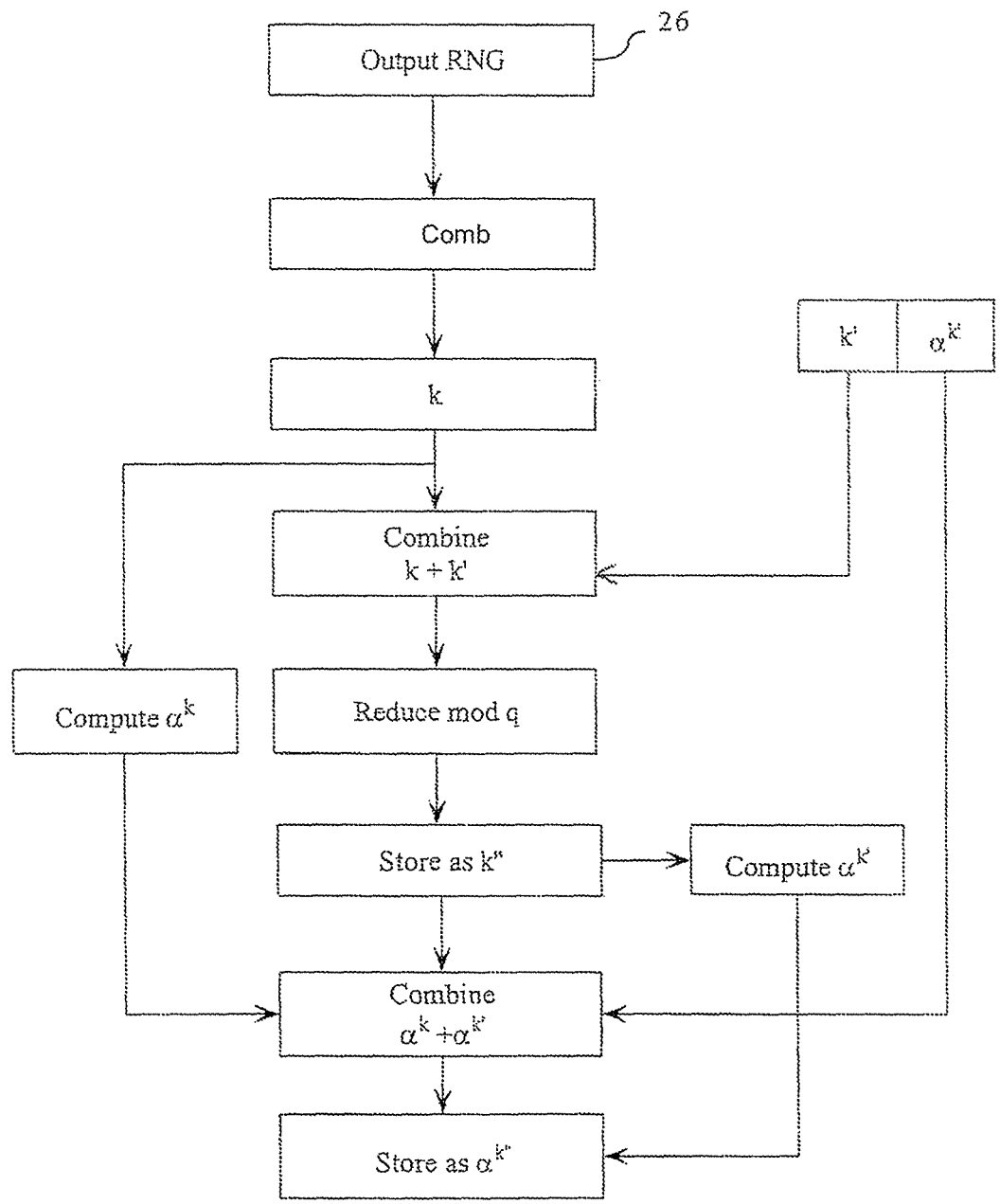
FIG. 7 is a flow chart showing a sixth embodiment.

As shown in FIG. 7, the value of k may be generated by utilizing a low Hamming weight integer obtained by combing the output of the random number generator 26 to facilitate computation of an intermediate public key $\alpha^k$. The integer is masked by combination with predetermined precomputed value k' to obtain the requisite Hamming weight for security. Such a procedure is disclosed in copending Canadian application 2,217,925. This procedure is modified to generate the low Hamming weight integer k as a bit string greater than 1, for example, a 180 bit string. The masking value k' is distributed throughout the 180 bit string and the resultant value reduced mod q to obtain a 163 bit value k". Note that the value $\alpha^{k''}$ can be efficiently computed by combining the precomputed value $\alpha^{k'}$ with the efficiently computable value $\alpha^k$.

A similar technique may be used by relying on multiplicative masking. In this embodiment the value of k is combined with a value $\beta$ where $\beta=\alpha^u$. The value of u is a secret value that is used to mask the low Hamming weight of k. Again, the values of u and the low Hamming weight number k can be chosen to have bit lengths greater than 1, for example, bit lengths of 180. The resultant value is k"=u$^k$ mod q. It will be appreciated that $\alpha^{k''}$ can be efficiently computed since $\beta=\alpha^u$ is precomputed, and since k has low Hamming weight.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for generating a random number less than a predetermined value, said random number for use in a cryptographic system, the method comprising:
   obtaining a bit string;
   determining if an integer value represented by the bit string is less than the predetermined value;
   in response to the integer value being less than the predetermined value, utilizing the integer value as the random number; and
   in response to the integer value not being less than the predetermined value, obtaining an updated bit string for generation of said random number.

2. The method of claim 1, wherein said bit string is obtained by applying a hash function to a second bit string and said updated bit string is obtained by applying said hash function to a third bit string.

3. The method of claim 1, wherein said bit string and said updated bit string are obtained using separate output values of a random number generator.

4. The method of claim 2, wherein said third bit string is obtained by processing said second bit string using a deterministic function.

5. The method of claim 4, wherein said deterministic function is a non-linear deterministic function.

6. The method of claim 1, wherein obtaining said bit string comprises concatenating a plurality of outputs from a hash function, each of said plurality of outputs corresponding to a different input for said hash function.

7. The method of claim 6, further comprising removing surplus bits after said concatenating to obtain said bit string.

8. The method of claim 2, wherein said bit string is obtained by applying a window to an output of said hash function, and obtaining said updated bit string comprises applying an incremented window to the output of said hash function.

9. The method of claim 6, wherein said bit string is obtained by applying a window to an output bit string obtained by said concatenating, and obtaining said updated bit string comprises applying an incremented window to the output bit string obtained by said concatenating.

10. The method of claim 1, wherein said predetermined value is related to a size of a group associated with said cryptographic system.

11. The method of claim 1, wherein said random number is used as a private key within said cryptographic system.

12. The method of claim 1, wherein said determining is executed without a modulo reduction of said integer value.

13. A non-transitory computer readable storage medium for generating a random number less than a predetermined value, said random number for use in a cryptographic system, the computer readable storage medium comprising computer executable instructions for:
   obtaining a bit string;
   determining if an integer value represented by the bit string is less than the predetermined value;
   in response to the integer value being less than said predetermined value, utilizing the integer value as the random number; and
   in response to the integer value not being less than the predetermined value, obtaining an updated bit string for generation of said random number.

14. The computer readable storage medium of claim 13, wherein said bit string is obtained by applying a hash function to a second bit string and said updated bit string is obtained by applying said hash function to a third bit string.

15. The computer readable storage medium of claim 13, wherein said bit string and said updated bit string are obtained using separate output values of a random number generator.

16. The computer readable storage medium of claim 14, wherein said third bit string is obtained by processing said second bit string using a deterministic function.

17. An electronic device comprising a processor coupled to a memory, the memory comprising executable instructions for configuring said processor to:
   obtain a bit string;
   determine if an integer value represented by the bit string is less than a predetermined value;
   in response to the integer value being less than the predetermined value, utilize the integer value as the random number; and
   in response to the integer value not being less than the predetermined value, obtain an updated bit string for generation of said random number.

18. The electronic device of claim 17, wherein said bit string is obtained by applying a hash function to a second bit string and said updated bit string is obtained by applying said hash function to a third bit string.

19. The electronic device of claim 17, wherein said bit string and said updated bit string are obtained using separate output values of a random number generator.

20. The electronic device of claim 18, wherein said third bit string is obtained by processing said second bit string using a deterministic function.

* * * * *